United States Patent [19]

Levko

[11] Patent Number: 4,524,248
[45] Date of Patent: Jun. 18, 1985

[54] ALTERNATE ACTION HEADLAMP SWITCH WITH MECHANICAL LOGIC

[75] Inventor: Fred Levko, Evanston, Ill.

[73] Assignee: Illinois Tool Works Inc., Chicago, Ill.

[21] Appl. No.: 538,314

[22] Filed: Oct. 3, 1983

[51] Int. Cl.³ .............................................. H01H 9/26
[52] U.S. Cl. .................................. 200/5 B; 200/153 J
[58] Field of Search ..................... 200/4, 61.27, 61.28, 200/61.29, 61.30, 61.31, 61.32, 61.33, 61.34, 61.35, 61.36, 61.37, 61.38, 61.54, 5 E, 5 B, 153 J, 153 JH, 328

[56] References Cited

U.S. PATENT DOCUMENTS 3,312,809 4/1967 Hill et al. ............................. 200/327
3,557,328 1/1971 Winogrocki et al. ............ 200/61.27

*Primary Examiner*—A. D. Pellinen
*Assistant Examiner*—Morris Ginsburg

*Attorney, Agent, or Firm*—Donald D. Mondul; Thomas W. Buckman

[57] ABSTRACT

An alternate action headlamp switch with mechanical logic is provided. One plunger and overcentering latching mechanism are provided for a push-push operation to turn parking lights on and off. A second plunger and like latching mechanism are provided for turning headlamps on and off. Interlocking mechanism between the plungers is provided so that when the headlamp plunger is depressed the park plunger is also depressed whereby to turn on both the headlamps and the parking lights. Further interconnecting mechanism is provided so that if the park plunger is already depressed and the parking lights are on, depression of the headlamp plunger will release the park plunger latching mechanism. The operating portion of the parking light plunger is held in on condition through the interconnection with the headlamp plunger until such time as the headlamp plunger is again depressed to release it whereby the headlamps and parking lights simultaneously are extinguished.

16 Claims, 15 Drawing Figures

ALTERNATE ACTION HEADLAMP SWITCH WITH MECHANICAL LOGIC

BACKGROUND OF THE INVENTION

Contemporary automobiles have both headlights and parking lights. It is desirable or necessary that the parking lights be capable of being turned on independently of the headlights, but that the parking lights be turned on whenever the headlights are turned on. Having the parking lights turned on along with the headlamps is a safety feature in that it provides a more positive visual indication of the location of an automobile in the dark, particularly in a case when a headlamp is burned out.

Prior art switches and circuits for providing independent turning on of parking lights and conjoint illumination of headlamps and parking lights have been too complicated, or unreliable, or too expensive.

OBJECTS AND SUMMARY OF THE PRESENT INVENTION

It is an object of the present invention to provide mechanical switch means affording independent lighting of parking lights and insuring lighting of parking lights at all times that the headlamps are turned on in an automobile.

A further object of the present invention is to provide mechanical logic in an electrical switch means for independent illumination of parking lights and conjoint illumination of parking lights and headlamps.

Older automobiles have utilized switches for controlling parking lights and headlamps in which the driver moves the knob or other switch control in one direction, such as by pulling on it, to turn lights on, and then moves it in the opposite direction, as by pushing on it, to turn lights off. Such switches are not well adapted to the requirement of individual switching on and off of parking lights, but conjoint operation of headlamps and parking lights.

Push-on push-off switches are known in the art, and one such switch utilizing a toggle action for holding the switch mechanically in closed position is shown in Hill et al, U.S. Pat. No. 3,312,809. In accordance with the present invention toggle latching means as shown in the aforesaid U.S. Pat. No. 3,312,809 is used, but with an entirely different switch contact arrangement. Two operating mechanisms are mounted on a common base and are provided with interconnecting structure so that one of the operating mechanisms may be operated independently to switch parking lights on and off, but is under control of the second operating mechanism to insure that whenever the headlights are turned on by the second mechanism the first mechanism is controlled by the second to illuminate the parking lights simultaneously with the headlamps. The toggling, latching action of the switch mechanisms and the interconnections between the two switches provide a mechanical logic for insuring the desired switch operation.

THE DRAWINGS

The invention will best be understood from the following description when taken in connection with the accompanying drawings wherein.

DETAILED DESCRIPTION OF THE DISCLOSED EMBODIMENT

Figure 1:
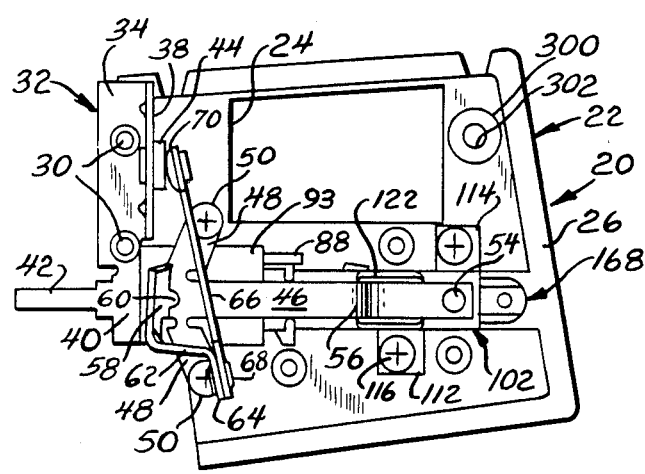
FIG. 1 is a side view of an alternate action headlamp switch with mechanical logic constructed in accordance with the principles of the present invention.
Figure 2:
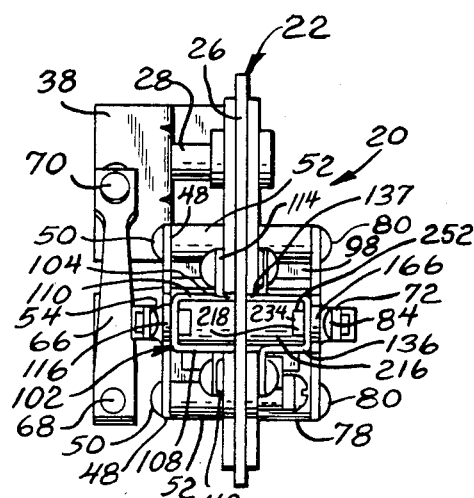
FIG. 2 is an end view taken from the right end of FIG. 1.
Figure 3:
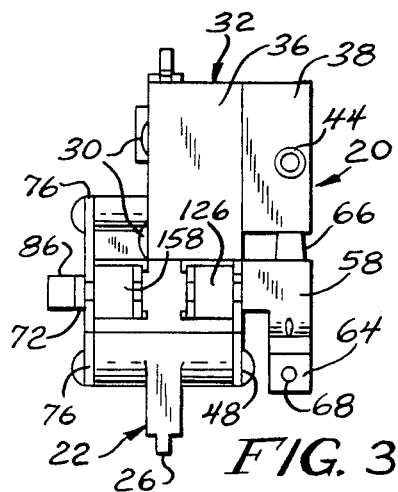
FIG. 3 is an end view taken from the left end of FIG. 1.
Figure 4:
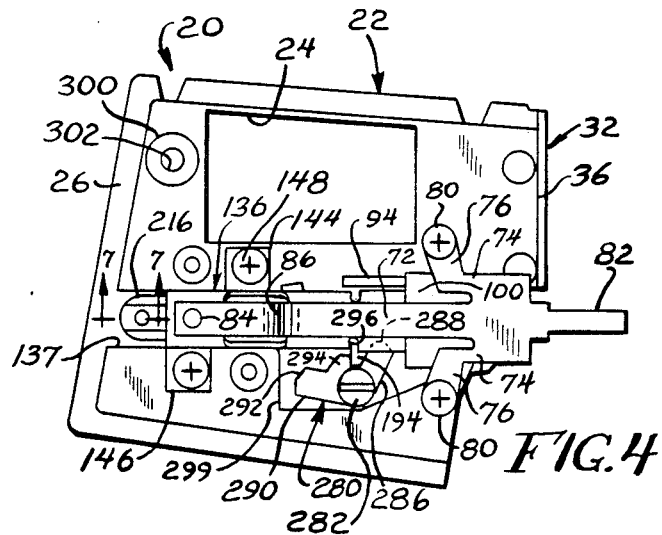
FIG. 4 is a backside view taken from the opposite side of FIG. 1.

Turning now in greater particularity to the drawings, and first to FIGS. 1–6 and 8, there will be seen an alternate action headlamp switch 20 constructed in accordance with the principles of this invention and comprising an insulating base 22 preferably formed of a nylon resin. The base 22 is substantially planar and comprises a quadrilateral figure roughly approximating a square. Near the upper edge the base is provided with a relatively large window 24 for illumination access, while an alignment rib 26 lies along three edges of the base.

Along the left edge of the base and relatively in the upper portion thereof there is provided a pair of vertically spaced cylindrical bosses 28 through which rivets 30 extend to mount a circuit breaker contact 32. The circuit breaker contact is essentially a copper sheet having a web 34 through which the rivets 30 pass, a wide, right angle flange 36 braced at the upper portion against the end of the base 22, and a contact flange 38 offset from and extending in the opposite direction from the flange 36. A lower depending portion 40 of the web 34 is provided with an extending blade terminal 42. An electrical contact 44 is riveted to the flange 38 approximately centrally thereof. The contact is made of a suitable metal having good electrical conductivity characteristics and resistant to burning and oxidation.

A head-lamp switch blade 46 is disposed substantially opposite to the circuit breaker contact terminal 42 and is provided with oppositely extending ears 48 secured by screws 50 to bosses 52 integral with the base 22. The blade is provided relatively near its free extremity with a riveted contact 54 similar to the contact 44, and the blade is provided relatively toward the extremity with a hump 56. The hump 46 is for cooperation with a switch operator as will be brought out hereinafter.

From a position at the junction of the blade 46 and the ears 48, there is an outwardly directed flange 58 having an indented reinforcement 60 at the junction, this flange carrying at its bottom edge an arm 62 having a mounting flange 64 at the bottom edge thereof. The junction of the flange 58 and the arm 62 is indented for reinforcement. Alternatively the head lamp switch blade 46 may be formed as a two piece assembly, for example, comprising one piece including the switch blade 46 and the arm 62, plus a second piece including the ears 48 and the flange 58. In such an embodiment the two pieces would be physically as well as electrically in contact with each other when the switch is assembled.

A bi-metal circuit breaker blade 66 is riveted at 68 to the flange 64 and extends upwardly thereof, having at its upper end a riveted electrical terminal 70 which engages the previously identified terminal 44. In the event of a short circuit or other malfunction causing too much current to pass through the headlamp circuit the bi-metal blade 66 will deflect to the right and open the electrical circuit between the contacts 44 and 70.

On the opposite side of the base a parking light switch blade 72 is provided. This blade has at its base lateral extensions 74 carrying ears 76 which are mounted to bosses 78 by means of screws 80. A blade terminal 82 extends oppositely of the blade and parallel to the terminal 42. The blade 72 is provided adjacent its extremity with a riveted contact 84, and relatively adjacent the extremity there is a hump 86. Like the hump 56, the hump 86 is outwardly away from the remainder of the switch and is provided for coaction with a switch actuator as will be brought out hereinafter. Alternatively the parking light switch blade 72 may be formed as a two piece assembly, for example comprising one piece including the switch blade 72, plus a second piece including the extensions 74, the ears 76 and the blade terminal 82. In such an embodiment the two pieces would be physically as well as electrically in contact with each other when the switch is assembled.

On the headlight side of the base 22 there is an outwardly projecting wall 88 extending from the lower of the two bosses 28 to a position underlying the window 24. A parallel wall 90 is spaced below the wall 88 and extends to a position underlying the boss 28, being joined to the boss 52 by a web 92. A thin insulating member 93 overlies the outer edges of the walls 88 and 90 and underlies the blade 46 and ears 48 to insulate the same from an underlying conducting member shortly to be described. Alternatively, bosses 52 can be extended a further length from the base 22 to provide an air gap between the blade 46 and the ears 48 and the underlying conducting member, thereby eliminating the need for insulating member 93.

On the opposite or parking light side of the base 22, there is a wall 94 positioned identically to and opposite to the wall 88. Similarly, there is a wall, 96 in generally mirror image to the wall 90 and joined by a web 98 to the boss 78. A thin insulating plate 100 overlies the outer edges of the walls 94 and 96 and underlies the blade 72 and attached parts to insulate it from an underlying conducting member shortly to be described. Alternatively, bosses 78 can be extended a further length from the base 22 to provide an air gap between the blade 72 and attached parts and the underlying conducting member, thereby eliminating the need for insulating plate 100.

The headlamp side of the switch assembly is provided with a copper channel 102 received in an elongated recess 104 in the face of the base 22. The channel comprises a web 106 and parallel flanges 108 and 110. The flange 108 is provided with a lateral tab 112 spaced from the end, while the flange 110 is provided with a tab 114 at the end thereof. The tabs are set outwardly of the edges of the flanges 108 and 110 since these are disposed in the recess 104 and the tabs are intended to lie against the face of the base 22.

Fasteners 116 pass through the tabs 112 and 114 and are fastened to the base 22 to hold the channel in place. The lower flange 108 is provided at the left end with a notch 118, while the upper flange 110 is provided with a slot 120 adjacent the left end.

The web is provided generally centrally thereof from end to end with a cut out or rectangular slot 122. A wall 124 continues to the left as an integral extension of the web 106 and is provided at its end with an offset wall 126 which has at its extremity a plate 128 provided with an extending blade type terminal 130. The plate 124 is provided with a central aperture 132, and an integral extension 133 on the base 22, extends through this aperture and is touched with a heated implement to melt it to hold the plate 128 in place against the base 22. The wall 124 underlies the previously mentioned insulating member 92. Alternatively, there can be provided molded stops on base 22 and integral holding tabs on plate 124 which stops and tabs cooperate to snap in and hold plate 124 in position on base 22. The base 22 is provided with an elongated recess 137 on the parking light side and co-extensive with the recess 104. A channel 136 is mounted in this recess and includes a web 138 and upper and lower flanges 140 and 142 respectively. The edges of the flanges are received in the recess 137, and tabs 144 and 146 are deflected from the flanges outwardly of the edges thereof and have fasteners 148 passed therethrough and fastened to the base 22 to mount the channel. The flange 138 is provided with a slot 150 adjacent the flat end thereof, while the flange 142 is shortened or notched at 152. The web 138 is provided with an opening 154 just to the right of the notch 152 of the flange 142.

A wall 156 comprises a coplanar extension of the web 138 to the left thereof and is provided with an offset flange 158 which is spaced beyond the flange 126 of the channel 102. A narrow plate 160 extending from the flange 158 is provided with an aperture 162 for receipt of an integral stud 164 on the base 122, the stud being melted by a hot tool to mount the plate to the base. Alternatively there can be provided molded stops on base 22 and integral holding tabs on plate 160 which stops and tabs cooperate to snap in and hold plate 160 in position on base 22. A blade type terminal 165 extends from the plate 160 oppositely of the wall 156, and in parallel array with the previously mentioned terminals 42, 82 and 130.

The channel 136 is made of copper sheet metal, and it is provided with a riveted electrical contact 166 disposed opposite the contact 84 for engagement therewith, corresponding to the contacts 54 and 116.

A headlamp switch operating plunger 168 is provided under the channel 102 and in the recess or groove 104 of the base 22. This plunger is made of a satisfactory plastic material, and one preferred example is teflon filled acetal. The plunger 168 includes a body 170 having a cylindrical end 172. At the end of the body opposite the cylindrical end surface 172, there is an outwardly projecting cam 174 having an inclined surface 176. This cam normally holds the blade 46 outwardly so that the contacts 54 and 116 are out of engagement. However, as will appear presently, the cam is capable of movement beneath the hump 56, whereupon the aforesaid switch contacts can close.

The plunger is recessed beneath the cam 174 at 177, and the plunger continues onwardly with a pair of spaced arms 178 which continue the recess. The arms 178 continue to top and bottom walls 180 leading to a transverse wall 182 forming a part of a head structure 184. The head structure includes a top wall 186 and a bottom lug 188. A vertical transverse wall 190 extending longitudinally of the plunger 168 joins the top wall 186 and the lug 188. The top wall extends at 192 beyond the transverse longitudinal wall 190, while the lug 188 continues beyond the transverse wall at 194. The extending wall 192 and the lug 194 extend through a window 196 in the base 22 extending between the recesses 104 and 137. As will be seen, a cavity is defined by the walls 186 and 190 and the lug 188, and a compression spring 198 is mounted within this cavity and bears against the wall 126 of the channel 102.

Latching structure is mounted within the recess 177 and behind the arms 178, including a latch member 200, a pivot 202, and a latch spring 204. These elements will be discussed at greater length in connection with FIGS. 9-14 hereinafter.

The inner face of the body 170 is provided with a bore 206 (FIG. 7) in which there is a compression spring 208 and a ball 210. The confronting face of the base 22 is provided with a recess 212 in which the ball rides, and a shoulder 214 against which the ball bumps and then retracts into the bore 206, thus providing a tactile feel so that the operator can tell when the switch is operated in either direction.

On the opposite face of the base 22 a park plunger 216 and a park follower 218 are mounted between the channel 136 and the groove 137. The park plunger 216 includes a body portion 220 having a cylindrical end 222. The body portion has a recess 224 opposite to the cylindrical portion 222 and has a bore 226 therein. A similar recess and bore are provided in the headlamp plunger 168, but are not shown. Adjacent to the recess and in the face of the end 222 facing the base 22 there is a recess or bore 228 for receiving a compression spring 230 and a ball 232, similar to the compression spring 208 and ball 210 of the headlamp plunger 168. The track in which the ball rides is not specifically shown in the drawings, but the structure is identical to that of FIG. 7.

Along the opposite face of the body 220 there is provided an elongated wall 234 having an upstanding end wall 236 thereon. An integral axially extending pin 238 is provided on the wall 236. Like the plunger 168 the park plunger 216 preferably is formed of a Teflon filled acetal, as is the park follower 218. The wall 234 is provided with a window 240 adjacent to the wall 236. The window 240 provides clearance for movement of the tension spring 246 with the T-shaped latch member 242 during operation of the switch when in an assembled condition.

Latching structure is mounted on the park plunger 216 and is substantially identical with that previously described rather generally on the headlamp plunger 168. Such latching structure includes a generaly T-shaped latch member 242, a pivot member 244, and a tension spring 246. The pivot member 244 is generally L-shaped, having a leg 248 received in the bore 226, and an adjacent notch 250 allowing the latch member to be set down closer to the wall 234.

The wall 234 is provided on its outer face (FIGS. 8 and 2) with a longitudinally extending groove or channel 252. The park follower 218 includes an elongated body portion 254 which is received in the groove or channel 252. This body is provided with an outwardly directed cam 256 having a cam surface 258 (FIGS. 5 and 6) engageable with the switch blade 72 to hold the contacts 84 and 166 out of engagement with one another, but movable under the hump 86 to allow these contacts to come into engagement.

The park follower 218 further includes an upstanding block 260 having opposite faces 262 and 264, and a top face 266. A transverse wall 268 is wider than the surface 266, and forms with a continuation of the body 254 and upstanding sidewalls 270 and 272 a recess or cavity 274.

A spring 276 is received within the cavity 274, bearing against the transverse wall 268. This spring also bears against the offset flange 158 of the channel 136, to urge the park follower 218 upwardly and to the right in FIG. 8. Another compression spring 278 encircles the pin 238 and bears against the block 260 to urge the park plunger 216 upwardly and to the right in FIG. 8.

The flange 192 and the arm 194 of the headlamp plunger 168 both extend through the opening or window 196 or the base 22. The flange 192 lies against the face 264 of the park follower 218 with the edge thereof abutting the junction of the transverse wall 268 and the upper wall 272. The arm 194 cooperates with a bell crank lever 280 (FIGS. 4 and 8) pivotally mounted on the base 22 adjacent the window 196 by means of a screw 282 passing through oppositely extending bosses 284 on the lever. Alternatively, lever 280 can be captured by and rotate upon a post molded into base 22. Aside from the bosses 284 the bell crank lever 280 is generally flat, and is molded integrally with the bosses of a suitable plastic, Teflon filled acetal being a preferred example. The bell crank lever 280 includes an operated arm 286 which in the idle position (FIG. 4) has a generally pointed end 288 engaging the surface 180 of the headlamp plunger 168. The side of the arm 286 is engaged by the plunger arm 194.

A second or blocking arm 290 is disposed at an obtuse angle slightly greater than 90° relative to the arm 286, and includes an angled tip having an oblique surface 292 engageable with the sides of the body 220 of the park plunger 216 with the bell crank lever pivoted clockwise (from the position as viewed in FIG. 4) to operating position. A tooth 294 on the inner or upper surface of the arm 290 is engageable with the surface of the arm 194, the tooth 294 and the arm 286 forming between them a notch 296 receiving the arm 194. Alternatively, tooth 294 can be omitted and arm 194 can simply be received in the crook formed by arm 290 and arm 286. The backside of the arm 290 is provided with a projection 298 (FIG. 8) which rides against the surface of the base 22 within a recess 299 in the base.

Figure 8:
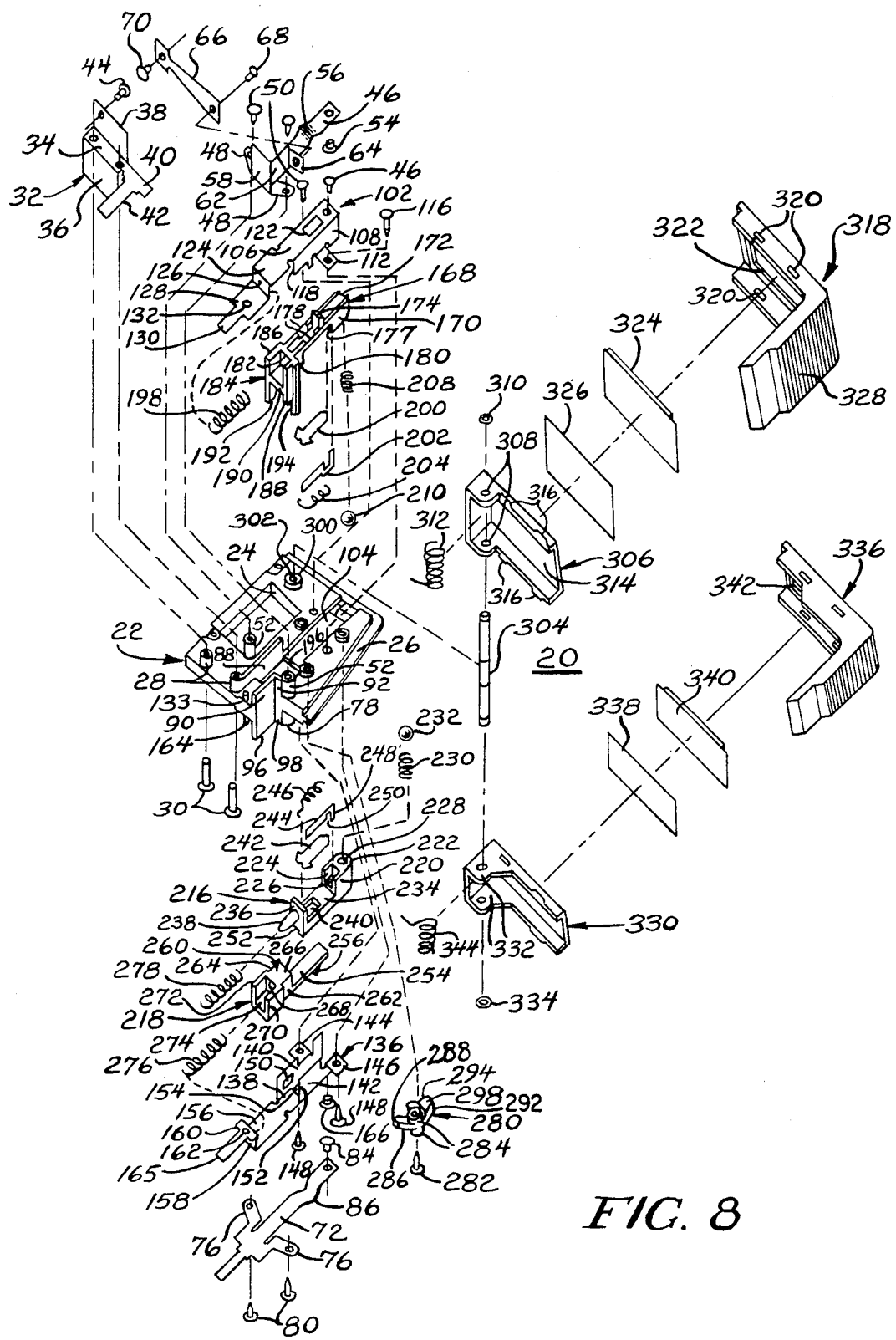
FIG. 8 is an exploded perspective view of the switch on a slightly reduced scale.

Before turning to a fuller disclosure of the latching mechanism and the operation thereof the remaining parts in FIG. 8 will be disclosed. The base 22 is provided with aligned bosses 300 on opposite sides thereof located immediately to the right of the window 24 in FIGS. 1, 5 and 8 (to the left in FIG. 4). A bore 302 extends through the bosses and through the base and receives a pivot pin 304 (FIG. 8). An operating arm or lever 306 is mounted on the pin on the headlamp side of the switch by means of apertured ears 308 received over the pin. A retainer 310 is mounted on the extremity of the pin to retain the lever in position. A light biasing spring 312 encircles the pin and coacts with the lever and the base to urge the flat body portion 314 of the lever against the cylindrical end 172 of the headlamp plunger 168. The lever is generally channel shaped and includes laterally extending projections 316 for retaining other parts thereon as will appear shortly hereinafter.

An L-shaped actuator cover 318 is generally channel shaped in cross section and has apertures 320 in the sidewalls receiving the retainer projection 316 of the lever 306. The portion of the actuator cover adjacent the wall or web 314 of the lever 306 is provided with a rectangular window 322. A lens 324 and a legend panel 326 are secured beneath the window 322 and against the wall 314. The L-shaped actuator cover 318 has a right angle leg thereon provided with a serrated surface 328 for convenient finger engagement. Pressing on this surface produces pivoting of the lever 306. This in turn bears against the headlamp plunger 168 and causes the same to be depressed as will be discussed in due course.

A parking light lever 330 is generally similar to the headlamp lever 306, save for slightly larger ears 332, and is pivotally mounted on the other end of the pin 304, a retainer 334 being applied to the outer end of the pin 304 to retain the lever in place. A parking light actuator cover 336 generally similar to the headlamp actuator 318 is fixed to the lever 330 in generally the same manner as the headlamp actuator is secured to its lever. Both actuators are molded of plastic, preferably polycarbonate. A park legend panel 338 and a park lens 340 are positioned beneath a window 342 in the park actuator 336. A torsion spring 344 lightly urges the actuator 336 and lever 330 against the park plunger 216. Alternatively, the portion of base 22 which defines the two sides of window 24 opposite boss 52 and which contains bosses 300 can be omitted and the mounting of operating arms 306 and associated components can be accommodated by a housing enclosing the switch 20.

Attention now should be directed to FIGS. 9-14 for a better understanding of the physical structure and operation of the latch mechanism. The two latch mechanisms for the respective plungers are identical, and only that associated with the headlamp plunger is shown in FIGS. 9-14. The latch member 200 is generally T-shaped in nature, having an upright stem or shank 346 with a tapered lower end 348 terminating in a rounded tip 350 of realtively small diameter. At the top end of the shank or stem 346 there is a symmetrical cross member 352 having a notch 354 in the top center thereof receiving the upper end of the tension spring 204. The anchoring of the bottom end of the sping will be discussed presently with regard to FIG. 9A. The cross member 352 includes a right side claw or hammer 356 having a downwardly protruding rounded tip 358 and an adjacent recess 360. The left side claw or hammer 362 is identical and includes a rounded protruding tip 364 and an adjacent notch 366.

The edge 368 of the slot 120 in the sidewall 110 of the channel 102 serves as a stop for the right side claw or hammer 356 while the terminal edge 370 of the left sidewall 108 of the channel 102 serves as a stop for the left claw or hammer 362. It will be apparent that the edge 370 is above the edge 368 (in a more advanced position of the plunger 168).

A pivot member 202 is of generally L-shape having an elongated stem 372 with an offset lower end 374 (FIG. 9A) providing a notch 376 receiving the lower end of the tension spring 204. The pivot member 202 is completed by a right angle finger 378 received in a bore 380 in the headlamp plunger 168. As may be seen in FIG. 9, the finger 378 is twisted slightly from the plane of the stem 372.

Figure 9:
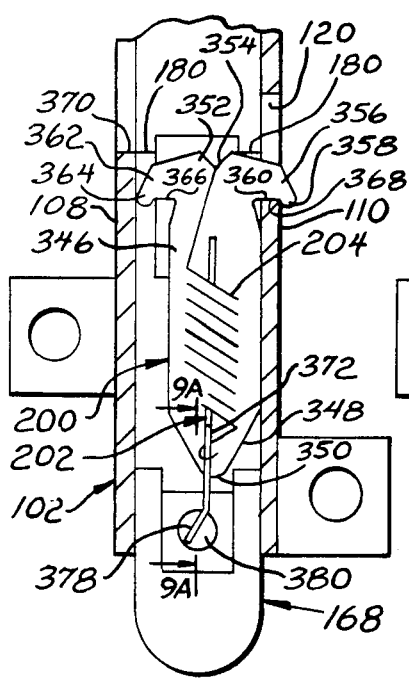
FIGS. 9–14 are sequence views showing operation of the toggling latching mechanism.
Figure 9A:
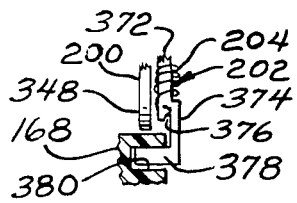

The initial or idle position of the latch means is shown in FIG. 9. In this position the notch 360 of the right claw or hammer 356 engages the notch edge 368 to limit downward (considered in the direction of FIGS. 9-14) movement of the latch member 346. The edge of the wall 180 of the plunger 168 engages the top edge of the claw or hammer 356, thus limiting downward or outward positioning of the plunger 168. It will be observed that the edge 180 is to the left of the edge 368. Accordingly, a counterclockwise couple is developed at that location, and this presses the right vertical edge of the latch stem 346 against the inside of the wall 110.

Figure 10:
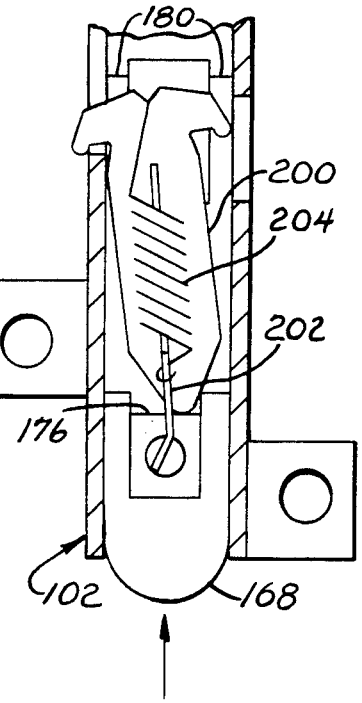

If the plunger 168 is depressed (up in FIG. 10) the rounded lower end 350 of the latch member 200 is engaged by a lead transverse wall 176 of the plunger. This is at a position to the right of the pivot center of the pivot member 202, and a toggling action is produced with the latch member 200 tipping to the left as shown in FIG. 10 with the left claw or hammer 362 projecting beyond the end of the wall at 370. Release of the plunger allows it to retract slightly and the left edge 180 engages the left claw to force the notch 360 thereof down against the wall end 370, thus positively limiting retraction, and pivoting the left edge of the latch member stem against the wall 108.

Figure 11:
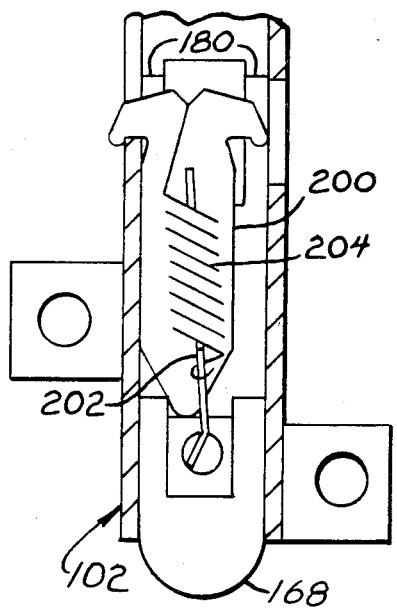
Figure 12:
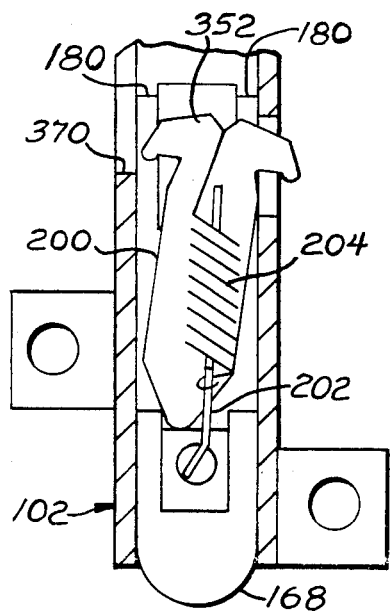
Figure 13:
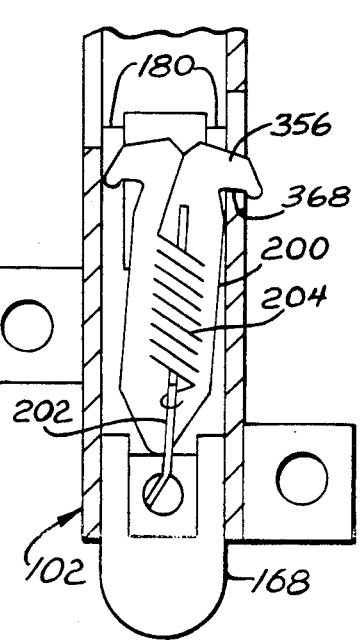
Figure 14:
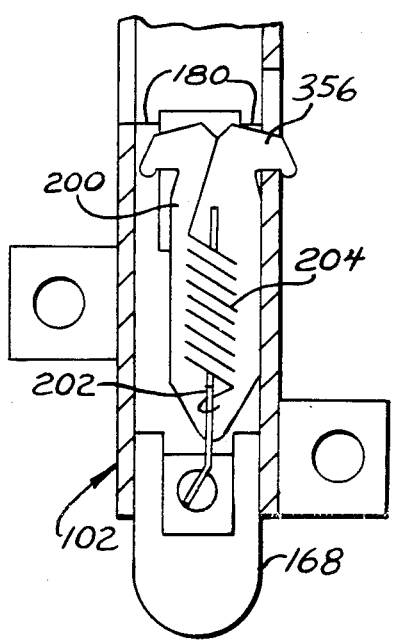

When the plunger 168 is again depressed, starting from the position of FIG. 11, the spring lies to the right of the tip 350 of the latch member 200, while the left hammer or claw 352 is freed from the wall edge 370. As a result, the latch member 200 pivots to the right as shown in FIG. 12. Release of pressure on the plunger 168 allows the plunger and other parts to retract to the position shown in FIG. 13 at which the right claw or hammer 356 engages the notch or slot edge 368. The plunger edge 190 then engages the top of the claw or hammer 356 and pivots the latch member 200 counterclockwise about this top end back to the initial position, FIG. 14 showing the same position as FIG. 9.

When the park plunger 216 is depressed the latch mechanism operates as just discussed. The spring 278 moves the park follower 218, and this moves the cam 256 to a position beneath the hump 86, whereby the switch contact 84 closes on the switch contact 166. This establishes a contact through the terminals 82 and 165, whereby the parking lights of an automobile incorporating the switch are illuminated.

When the headlamp plunger 168 is depressed the cam 174 moves beneath the hump 56 and the contact 54 closes against the contact 116 completing an electric circuit between terminals 42 and 130 for energization of the headlamps. At the same time the flange 192, being disposed adjacent the wall 264 of the park follower 218, pushes against the transverse wall 268 to advance the park follower. This moves the cam 256 beneath the hump 86 to close the parking light circuits as previously discussed. Thus, the headlamps and the parking lights are both on at the same time.

Figures 5, 6, 7:
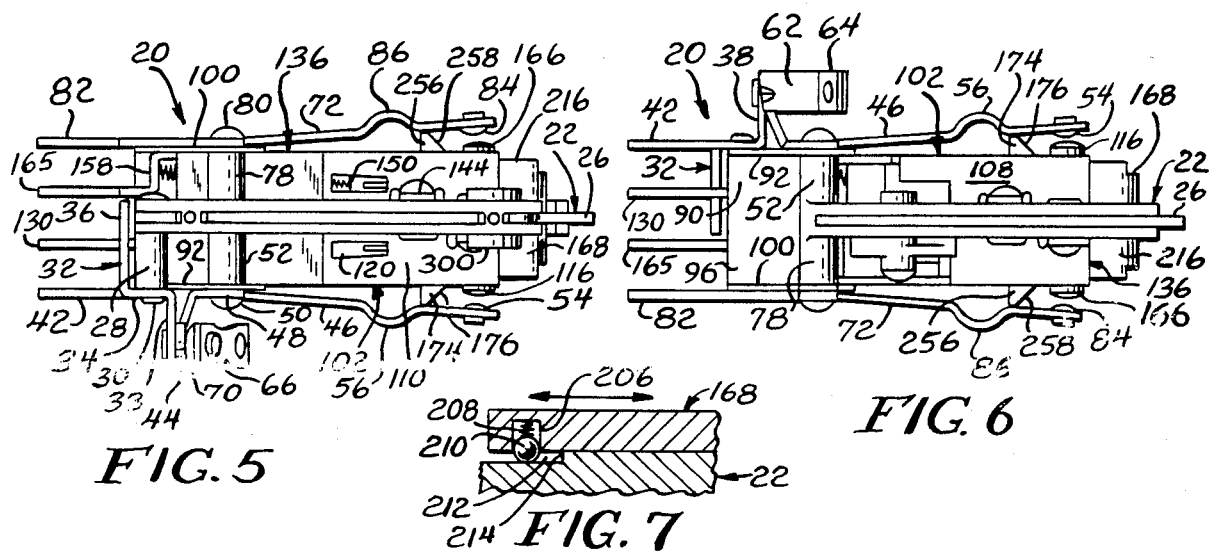
FIG. 5 is a top view.
FIG. 6 is a bottom view.
FIG. 7 is a detail sectional view on an enlarged scale taken substantially along the line 7—7 in FIG. 4.

If the park plunger 216 is already depressed and the parking lights are on when the headlamp plunger 168 is depressed the flange 192 again engages behind the wall 268 to hold the park follower in advanced position, whereby the parking lights stay on as the headlamps come on. However, the arm 194 engages the tooth 294 of the arm 290 of the bell crank lever 280 and pivots it clockwise from the position shown in FIG. 4 to a position in which the diagonal edge 292 of the arm 290 abuts the adjacent claw or hammer of the latch member 242 to press the hammer in from the edge of the flange 142, whereby the latch member is released from latching position. Thus, when the headlamp plunger 170 is again depressed and released to allow the cam 174 to move to switch opening position as shown in FIGS. 5 and 6, the park plunger 216 and park follower 218 also move to switch opening position with the cam 256 engaging the respective blade 72 to open the parking light circuit simultaneously with opening of the headlamp circuit.

From the foregoing it will be seen that the two interlocking plungers and the bell crank establish a mechanical logic. The following logic sequence occurs starting with both lighting functions off:

| Sequence | Plunger Depressed (Engagement) | Lighting Function Lighting Function |
|---|---|---|
| 1 | Park (Latched) | Park On |
| 2 | Park (Unlatched) | Park Off |
| 3 | Park (Latched) | Park On |
| 4 | Headlamp (Latched) Park (Unlatched) | Park On/Headlamp On |
| 5 | Park (Unlatchable) | No Change |
| 6 | Headlamp (Unlatched) | Park Off/Headlamp Off |
| 7 | Headlamp (Latched) | Park On/Headlamp On |
| 8 | Headlamp (Unlatched) | Park Off/Headlamp Off |

The specific example of the invention as herein shown and described is for illustrative purposes. Various changes in structure will no doubt occur to those skilled in the art and will be understood as forming a part of the present invention insofar as they fall within the spirit and scope of the appended claims.

The invention is claimed as follows:

1. An electric switch arrangement comprising a base, first manually operable switch operating means on said base, first switch contact means carried by said base, means interconnecting said first switch operating means and said first switch contact means for closing said first switch contact means in response to a first movement of said first switch operating means and for opening said first switch contact means in response to a second movement of said first switch operating means, second manually operable switch operating means on said base, second switch contact means carried by said base, means interconnecting said second switch operating means and said second switch contact means for closing said second switch contact means in response to a first movement of said second switch operating means and for opening said second contact means in response to a second movement of said second switch operating means, and means interconnecting said first switch operating means and said second switch operating means for effecting movement of both of said first and second switch operating means upon manual movement of said first switch operating means, but effecting movement of only said second switch operating means in response to manual movement of said second switch operating means; said first switch operating means comprising a push on-push off means, and said second switch operating means comprising a push on-push off means.

2. An electric switch arrangement as set forth in claim 1 and further including a first latching means interconnected with said first switch operating means and latching upon a first push and unlatching upon a second push, and a second latching means interconnected with said second switch operating means and latching upon a first push and unlatching upon a second push, said interconnecting means including means for unlatching said second latching means upon a first push on said first switch operating means if said second latching means is in latching position.

3. An electric switch arrangement comprising a base, first switch contact means carried by said base and movable between open and closed positions, first plunger means on said base and manually movable between rest and switch operating positions, first latch means interconnected with said first plunger means and operable upon a first depression of said first plunger means to latch said first plunger means in operating position and operable upon a second depression thereof to release said first plunger means for return to rest position, means interconnecting said first plunger means and said first switch contact means and operable with said first plunger means in rest position to maintain said first switch contact means in open position and with said first plunger means in switch operating position to maintain said first switch contact means in closed position, second switch contact means carried by said base and movable between open and closed positions, second plunger means on said base and movable between rest and switch operating positions, second latch means interconnected with said second plunger means and operable upon a first depression of said second plunger means to latch said second plunger means in operating position and operable upon a second depression thereof to release said second plunger means for return to rest position, means interconnecting said second plunger means and said second switch contact means and operable with said second plunger means in rest position to maintain said second switch contact means in open position and with said second contact means in switch operating position to maintain said second switch contact means in closed position, and means interconnecting said first plunger means and said second plunger means and effective upon manual depression of said first plunger means from rest to operating position to move said second plunger means from rest to operating position, and ineffective upon manual depression of said second plunger means from rest to operating position to move said first plunger means.

4. An electric switch arrangement as set forth in claim 3 wherein said interconnecting means includes means for releasing said second latching means if said second plunger means is latched in operating position when said first plunger means is depressed to operating position.

5. An electric switch arrangement as set forth in claim 3 wherein said plunger means interconnecting means comprises a lateral projection on said first plunger means and an abutment on said second plunger means engageable by said lateral projection.

6. An electric switch arrangement as set forth in claim 3 wherein said second plunger means comprises a plunger, a follower, and spring means acting between said plunger and said follower and causing said follower to move with said plunger, the means interconnecting said second plunger means and said second switch contact means being interconnected with said follower.

7. An electric switch arrangement as set forth in claim 6 wherein said plunger means interconnecting means comprises a lateral projection on said first plunger means and an abutment on said follower engageable by said lateral projection.

8. An electric switch arrangement as set forth in claim 7 wherein said second latch means is disposed on said plunger.

9. An electric switch arrangement as set forth in claim 7 wherein said second latch means is disposed on said plunger.

10. An electric switch arrangement as set forth in claim 3 wherein each switch contact means includes a switch arm resiliently biased toward switch closed position, and wherein each means interconnecting a plunger means and a switch contact means comprises a cam on the plunger means engageable with the respective switch arm.

11. An electric switch arrangement as set forth in claim 5 wherein said plunger means interconnecting means further comprises a second projection on said first plunger means, a lever pivotally mounted on said base, said second projection engaging said lever and pivoting it into latch releasing engagement with said second latch means.

12. An electric switch arrangement as set forth in claim 8 wherein said plunger means interconnecting means further comprises a second projection on said first plunger means, a lever pivotally mounted on said base, said second projection engaging said lever and pivoting it into latch releasing engagement with said second latch means.

13. An electric switch arrangement as set forth in claim 3 wherein said base comprises a substantially flat plate having first and second faces wherein said first plunger means, said first switch contact means, said first latch means, and the means interconnecting said first plunger means and said first switch contact means are mounted on said first plate face, wherein said second plunger means, said second switch contact means, said second latch means, and the means interconnecting said second plunger means and said second switch contact means are mounted on said second plate face, wherein said plate has an opening therein, and wherein the means interconnecting the first and second plunger means extends through said opening.

14. An electric switch means as set forth in claim 13 wherein said plunger means interconnecting means comprises a lateral projection on said first plunger means and an abutment on said second plunger means engageable by said lateral projection.

15. An electric switch arrangement as set forth in claim 14 wherein said second plunger means comprises a plunger, a follower, and spring means acting between said plunger and said follower and causing said follower to move with said plunger, said abutment being on said follower.

16. An electric switch arrangement as set forth in claim 15 wherein said second latch means is on said plunger, and wherein said plunger means interconnecting means includes a second lateral projection on said first plunger means extending through said plate opening, and a lever pivotally mounted on said second plate face and engageable by said second lateral projection for pivoting of said lever into latch releasing engagement with said second latch means, said second latch means being on said plunger.

* * * * *